United States Patent
Song et al.

(10) Patent No.: US 7,111,593 B2
(45) Date of Patent: Sep. 26, 2006

(54) ENGINE CONTROL TO COMPENSATE FOR FUELING DYNAMICS

(75) Inventors: Gang Song, Canton, MI (US); Ilya V. Kolmanovsky, Ypsilanti, MI (US); John Ottavio Michelini, Sterling Heights, MI (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 10/768,915

(22) Filed: Jan. 29, 2004

(65) Prior Publication Data

US 2005/0166900 A1  Aug. 4, 2005

(51) Int. Cl.
  *F02B 75/02* (2006.01)
(52) U.S. Cl. .............. 123/64; 123/673; 123/674; 123/698; 123/198 F
(58) Field of Classification Search ............ 123/64, 123/673, 674, 698, 198 F
  See application file for complete search history.

(56) References Cited

U.S. PATENT DOCUMENTS

| | | | |
|---|---|---|---|
| 4,896,644 A * | 1/1990 | Kato | 123/492 |
| 5,408,980 A | 4/1995 | Doering et al. | |
| 5,669,357 A * | 9/1997 | Denz et al. | 123/481 |
| 5,727,527 A * | 3/1998 | Mueller et al. | 123/481 |
| 5,735,249 A | 4/1998 | Parke et al. | |
| 5,746,183 A | 5/1998 | Parke et al. | |
| 5,762,054 A | 6/1998 | Schumacher et al. | |
| 5,839,409 A * | 11/1998 | Denz et al. | 123/326 |
| 6,067,965 A | 5/2000 | Trumpy et al. | |
| 6,176,222 B1 | 1/2001 | Kirwan et al. | |
| 6,257,206 B1 | 7/2001 | Doering et al. | |
| 6,360,713 B1 * | 3/2002 | Kolmanovsky et al. | 123/295 |
| 6,571,771 B1 | 6/2003 | Doering et al. | |
| 6,595,190 B1 | 7/2003 | Sealy et al. | |
| 6,615,804 B1 * | 9/2003 | Matthews et al. | 123/198 F |
| 6,736,108 B1 | 5/2004 | Rayl et al. | |

* cited by examiner

*Primary Examiner*—Erick R. Solis
(74) *Attorney, Agent, or Firm*—Allan J. Lippa; Alleman Hall McCoy Russell & Tuttle LLP

(57) ABSTRACT

A method for calculating transient fuel wall wetting characteristics of an operating engine is described. The method accounts for cylinder valve deactivation of cylinders in the engine in calculating the dynamic fueling compensation. In one example, fuel vaporization effects from fuel puddles in deactivated cylinders is considered when calculating the fueling compensation for active cylinders.

7 Claims, 11 Drawing Sheets

ENGINE CONTROL TO COMPENSATE FOR FUELING DYNAMICS

TECHNICAL FIELD

The field of the invention relates to internal combustion engine fuel injection compensation for fueling dynamics, wherein the fueling dynamics are variable between cylinders and the engine operates in various combustion modes depending on electric valve operation.

BACKGROUND OF THE INVENTION

Internal combustion engines are controlled to maintain a desired air to fuel ratio in the combustion chamber to reduce emissions. Fuel is delivered via electronically controlled fuel injectors, modernly located in intake parts of the engine's cylinders, for example. However, not all injected fuel enters the combustion chamber. Rather, some fuel is stored in the intake manifold of the engine. This phenomenon is known as "wall wetting" and various approaches are available for taking into account the fuel puddles in the intake manifold in controlling engine air fuel ratio.

Individual cylinder compensation can also be used to develop an individual cylinder wall wetting approach. See, U.S. Pat. No. 6,571,771.

The inventors herein have recognized a disadvantage with such approaches. Specifically, although the compensation is performed on an individual cylinder basis, if used for cylinders with deactivated cylinder valves, or cylinders operating in a variety of number of strokes, errors can occur. Specifically, even though cylinder valves may be deactivated, fuel vapors can still leave the fuel puddles and migrate to other cylinders, thereby affecting the inducted air-fuel ratio. As such, depending on the operating mode of the engine, different physical phenomena may occur.

SUMMARY OF THE INVENTION

Therefore, to overcome the disadvantages described above, an improved method is used in which a fuel wall wetting model is used which generates different compensation depending on the engine cylinder activation, or deactivation, mode. Also, compensation can be based on whether the engine is changing the number of strokes of the combustion cycle, with different compensation applied depending on the number of strokes carried out in the combustion cycle.

Further, in one example, individual cylinder fuel dynamic parameters are used to keep track of how much fuel is stored for each cylinder of the engine.

In this way, it is possible to separate the fuel puddle and vapor migration between firing, and non-firing cylinders. This allows for compensation of the effects of cylinder valve deactivation, including vapor migration from deactivated cylinders to active cylinders, and thus more accurate air-fuel ratio control.

Note that fueling dynamics can include both liquid and vapor fuel retained in a puddle, or multiple puddles, in the intake system (for example fuel retained in the intake manifold ports), wall wetting, fuel vaporization, and various other fueling dynamics.

In another example, the above disadvantages are overcome by a method for controlling an engine having at least a first and second cylinder, said first and second cylinders having an associated first and second fuel injector, respectively. The method comprises operating with said first cylinder inducting air and with valves of said second cylinder deactivated, and during said operation, injecting fuel to said first cylinder from said first fuel injector based on evaporated fuel from an intake port of said second cylinder.

Thus, by considering fuel evaporating from a puddle of another deactivated cylinder, it is possible to provide more accurate fueling to active cylinders, thus providing more accurate air-fuel ratio control. In another embodiment, by tracking and updating vapor fuel mass and puddle fuel mass at each combustion event to maintain the latest status for vapor fuel and puddle fuel at each cylinder, or intake port, it is also possible to provide more accurate fueling to active cylinders.

BRIEF DESCRIPTION OF THE DRAWINGS

The advantages described herein will be more fully understood by reading example embodiments illustrating advantageous operation, referred to herein as the Description of Example Embodiments, with reference to the drawings wherein:

FIG. 1 is a block diagram of an engine;

DETAILED DESCRIPTION OF EXAMPLE EMBODIMENT(S)

Figure 1:
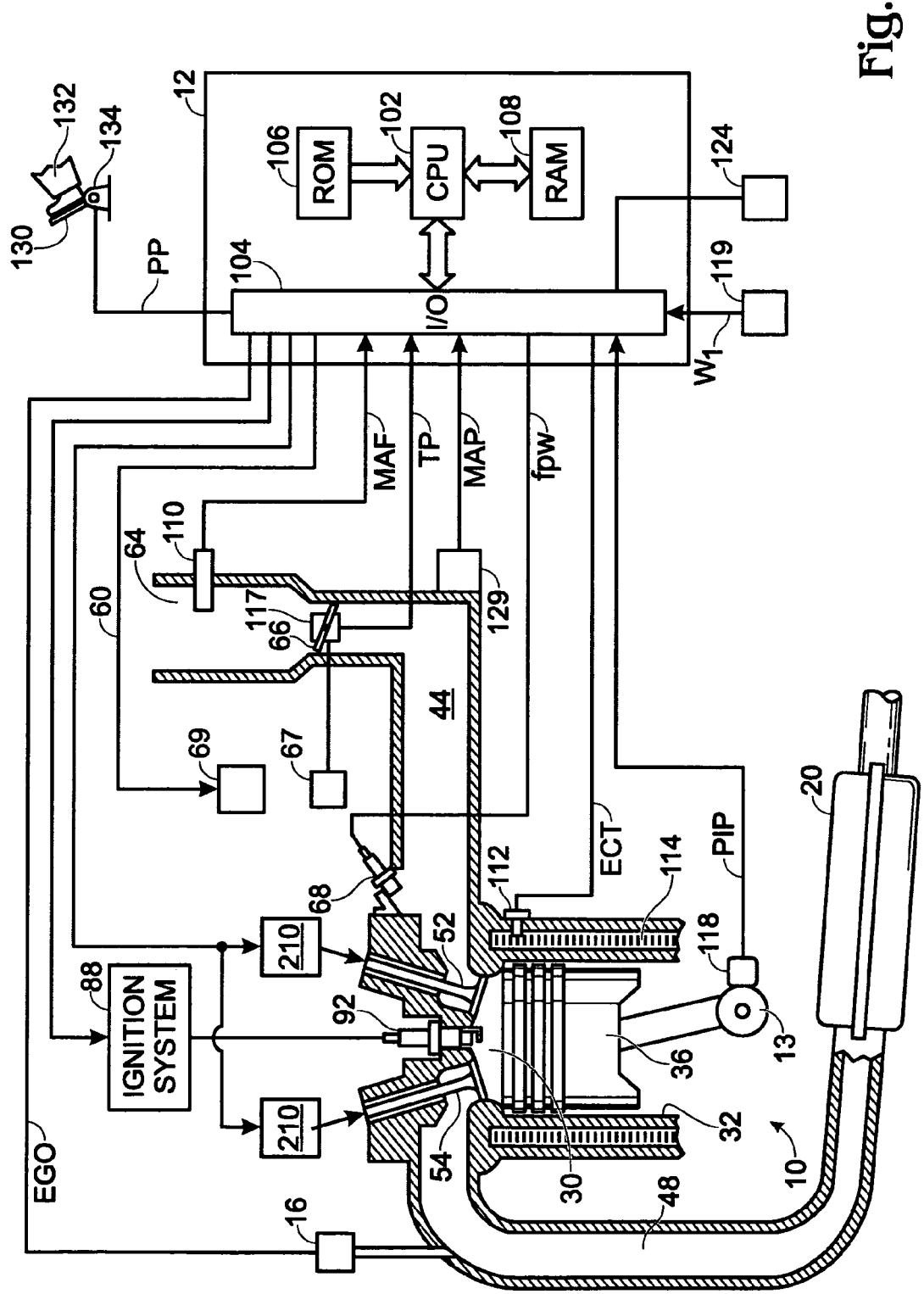
FIG. 1 is a block diagram of an engine illustrating various components related to the present invention.

Referring to FIG. 1, internal combustion engine 10 is shown. Engine 10 is an engine of a passenger vehicle or truck driven on roads by drivers. Engine 10 is coupled to torque converter via crankshaft 13. The torque converter is also coupled to transmission via turbine shaft. The torque converter has a bypass clutch which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission is also coupled to tires via an axle. The tires interface the vehicle to the road.

Internal combustion engine 10 comprising a plurality of cylinders, one cylinder of which, shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

As described more fully below with regard to FIGS. 2a and 2b, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded, or if vacuum is desired to operate accessories or reduce induction related noise.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (W1) from turbine speed sensor 119, where turbine speed measures the speed of the turbine shaft (output of a torque converter, if equipped), and a profile ignition pickup signal (PIP) from Hall effect sensor 118 coupled to crankshaft 13 indicating an engine speed (N) and position. Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 2A:
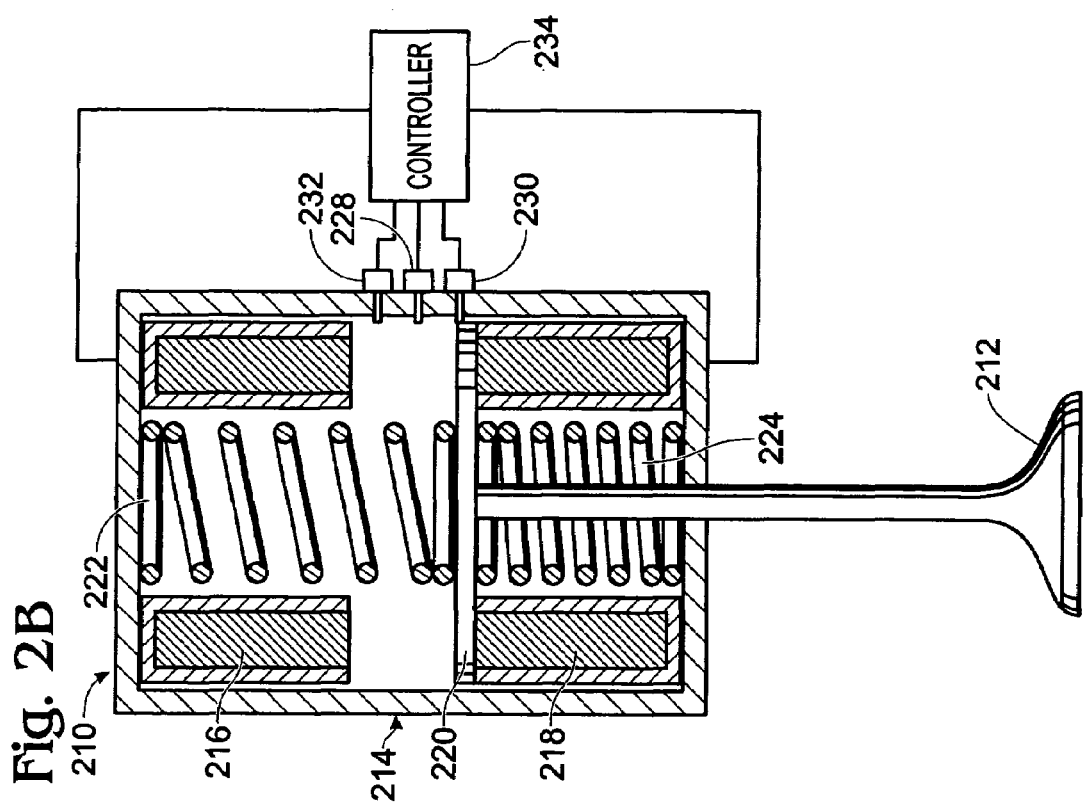
FIG. 2A shows a schematic vertical cross-sectional view of an apparatus for controlling valve actuation, with the valve in the fully closed position.
Figure 2B:
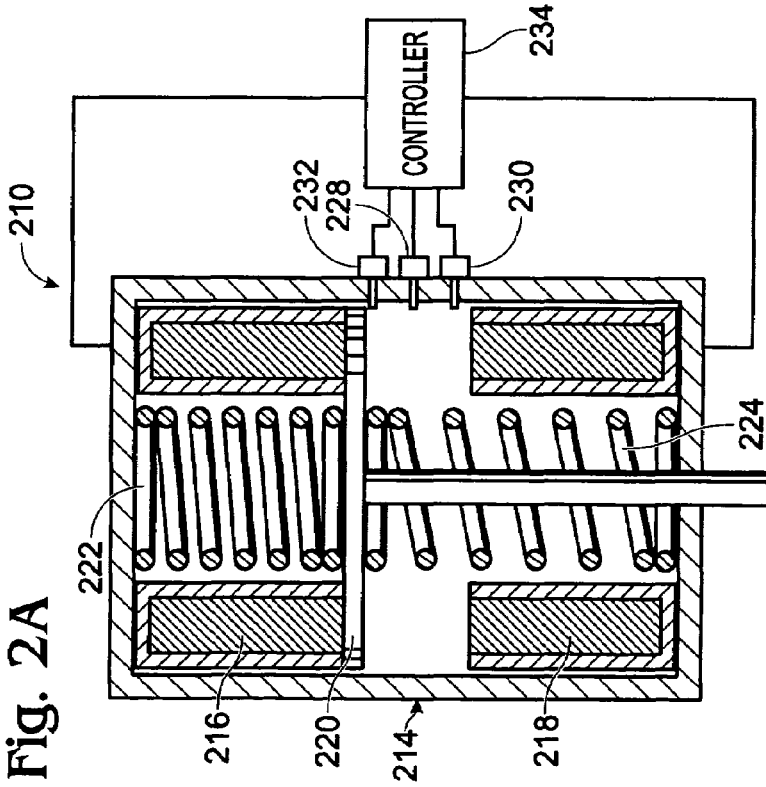
FIG. 2B shows a schematic vertical cross-sectional view of an apparatus for controlling valve actuation as shown in FIG. 1, with the valve in the fully open position.

Referring to FIGS. 2A and 2B, an apparatus 210 is shown for controlling movement of a valve 212 in camless engine 10 between a fully closed position (shown in FIG. 2A), and a fully open position (shown in FIG. 2B). The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Any other alternative of individually controlled intake valves could also be used, if desired.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216.

Fueling Dynamic Model

As described above, fueling dynamics affect the amount of fuel entering the cylinder when conditions vary, such as by changing the amount of injected fuel in a PFI engine. To compensate for these dynamics, the fuel injection amount is adjusted as described in more detail below.

In general terms, a cylinder (or intake port) specific transient fuel model is used to derive the fuel injection compensation. The parameters $\chi$ and $\tau$ are used to describe the transient behavior of injected fuel and a fuel film at the intake port. However, a distinct set of $\chi$ and $\tau$ values are used for each cylinder/intake port system. The model assumes a portion ($1-\chi$) of the mass flow rate of injected liquid fuel ($dm_f/dt$) enters the cylinder, while the remainder ($\chi dm_f/dt$) stays on the surface of intake port/ports, which forms a liquid film or puddle mass. In addition, the vapor from fuel left over in the intake port can also be included in this model and can contribute to the fuel mass in intake port ($m_p$), so the fuel puddle mass at the intake port can have a broader meaning.

Specifically, the compensation used herein includes the different conditions at different cylinder/intake port systems. As such, the fueling dynamic model uses a mass balance of fuel for each intake port. The model development is shown using the equations below.

Specifically, a mass balance is written on a fuel injector/intake port/cylinder basis. The amount of fuel entering is the mass flow rate of fuel injected from the injector ($dm_f/dt$). The mass flow rate of fuel exiting the puddle is denoted as ($dm_e/dt$), which is assumed proportional (via parameter $1/\tau$) to the mass of fuel in the puddle ($m_p$). Writing the mass balance then gives:

$$dm_p/dt = \chi dm_f/dt - dm_e/dt$$

Substituting for the flow entering the cylinder gives:

$$dm_p/dt = \chi dm_f/dt - m_p/\tau$$

However, while a time based model/compensation can be used, a discrete format (event-based) can also be used in engine control applications. The event-based approach gives:

$$m_p(k+1) = m_p(k) + \chi m_f(k) - m_p(k)/N_r$$

where:

k is the event index, e.g., updated at every firing of the engine, or every engine revolution, or after a certain amount of crank (or cam) shaft rotation, $m_p$ is the mass of fuel leftover in the intake port; and χ is the portion of the injected fuel that stays in the intake port either in liquid film form or vapor form.

$m_f$ is the fuel amount injected into the intake port during a given sample period, Nr is the characteristic time of fuel evaporation in the number of engine events, and τ is the time constant that describes the velocity of fuel in the intake port leaving the intake port.

At steady state, the amount of fuel trapped in the intake port is equal to the amount of fuel leaving the intake port, which is called an equilibrium state. At an equilibrium state, the injected fuel equals the inducted fuel into the cylinder.

As indicated above, the fuel mass flow into cylinder ($dm_{fcyl}$/dt) that joins combustion process can be described via following equation as the sum of the fuel exiting the puddle, and the portion from the injector not entering the puddle:

$$dm_{fcyl}/dt = (1-\chi)dm_f/dt + m_p/\tau$$

where $dm_{fcyl}/dt$ is fuel mass flow into cylinder.

Note that transportation delays in fuel injection, induction, combustion, and exhaust can be added, if desired.

The above mass balances can then be applied to a multi-port engine, and to include the sequential effect due to cycling engine operation.

In other words, engine 10 is equipped with a multi-port fuel injection systems so that each cylinder has an associated intake port, with an associated fuel injector located therein. Thus, since a single model that attempted to lump all of the port wall wetting dynamics together could be inaccurate due to different effects in different cylinders, an approach that considers the different operation of various cylinders can be used. The cylinder or intake port-based transient fuel model is thus based on observation of the actual operation process of a four-stroke (or multi-stroke) multi-port fuel injection engine.

As discussed above, experiments have shown that it is difficult to characterize transient fuel behavior by a single puddle model or so-called lumped fuel puddle model. Therefore, in one aspect, compensation that considers at least as many fuel puddles as the number of ports or cylinders is used. Further, the interval for consecutive combustion events is considered as one factor, if desired, to correlate transient fuel behavior at the intake ports with air/fuel measured by an air-fuel sensor (such as, for example, an UEGO sensor, or UEGO sensors for V-engine at the exhaust).

As an example, an in-line four cylinders engine with a multi-port fuel injection system is used to illustrate example operation. The liquid fuel is spread into each individual port by the associated fuel injector at each intake port. Therefore, in this example, there are four individual fuel puddles considered to be located at each intake port. Note, however, that additional puddles in the ports could also be added, if desired. Also note that the following development is in the cycle based domain (alternatively, the compensation could be event based, a crank angle based, or a time based approach could be used, if desired).

Figure 2C:
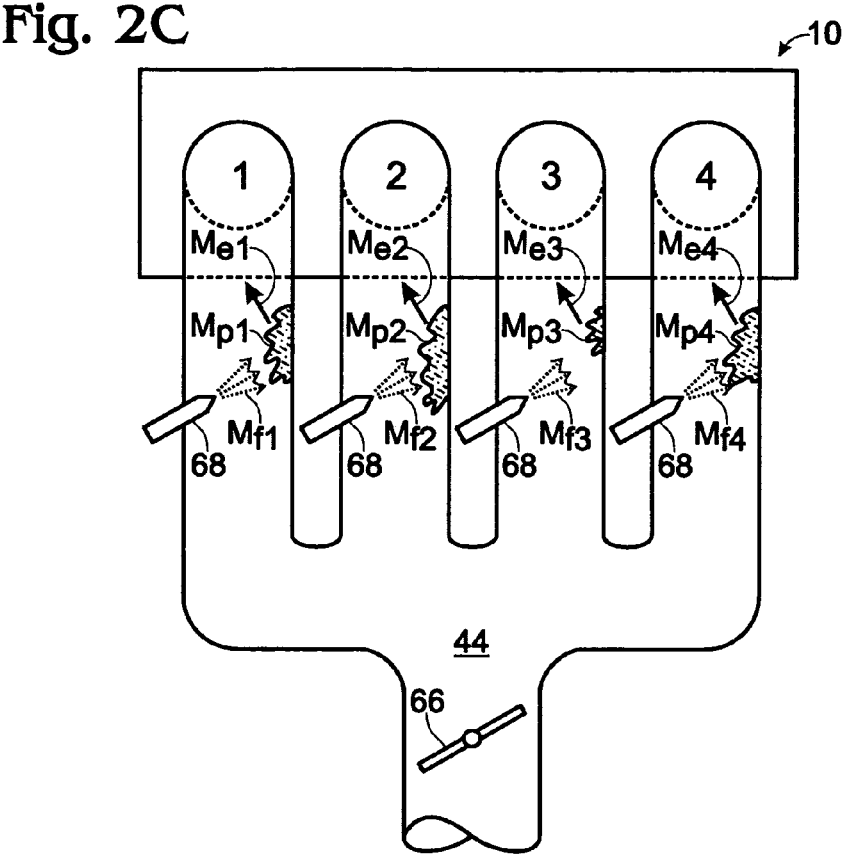
FIG. 2C is a diagram showing multiple intake ports of the engine.

Several additional assumptions can also be used, if desired. For example, the difference in time for fuel puddles at each port can be neglected, and therefore each fuel puddle would have the same transient behavior without considering the asymmetrical effect of ports, temperature difference at each port, and the difference of injector characteristics. However, the difference in fuel masses could still be used to provide improved fueling compensation. Specifically, as shown in FIG. 2C, each intake port can be considered to have a different mass of puddle ($m_p$) based on the amount of fuel injected from the injector associated with that puddle (i.e., the injector associated with that port).

From this point, the transient fuel effect observed at the exhaust would then be the linear combination of each cylinder—or intake port-based fuel puddle dynamics on the same time scale. The transient fuel dynamics at two consecutive cylinders would shift one cylinder event.

In the four cylinders PFI engine, assuming the firing order is 1-3-4-2, gives:

$$\begin{bmatrix} m_{p1}(k+1) \\ m_{p3}(k+1) \\ m_{p4}(k+1) \\ m_{p2}(k+1) \end{bmatrix} = \begin{bmatrix} m_{p1}(k) \\ m_{p3}(k) \\ m_{p4}(k) \\ m_{p2}(k) \end{bmatrix} + \chi \begin{bmatrix} a_1(i) \\ a_3(i) \\ a_4(i) \\ a_2(i) \end{bmatrix} m_f(k) -$$

$$\frac{1}{N_r} \begin{bmatrix} a_1(i) & 0 & 0 & 0 \\ 0 & a_3(i) & 0 & 0 \\ 0 & 0 & a_4(i) & 0 \\ 0 & 0 & 0 & a_2(i) \end{bmatrix} \begin{bmatrix} m_{p1}(k) \\ m_{p3}(k) \\ m_{p4}(k) \\ m_{p2}(k) \end{bmatrix}$$

and $$\begin{bmatrix} m_{fcyl\_1}(k+1) \\ m_{fcyl\_3}(k+1) \\ m_{fcyl\_4}(k+1) \\ f_{fcyl\_2}(k+1) \end{bmatrix} =$$

$$(1-\chi) \begin{bmatrix} a_1(i) \\ a_3(i) \\ a_4(i) \\ a_2(i) \end{bmatrix} m_f(k) + \frac{1}{N_r} \begin{bmatrix} a_1(i) & 0 & 0 & 0 \\ 0 & a_3(i) & 0 & 0 \\ 0 & 0 & a_4(i) & 0 \\ 0 & 0 & 0 & a_2(i) \end{bmatrix} \begin{bmatrix} m_{p1}(k) \\ m_{p3}(k) \\ m_{p4}(k) \\ m_{p2}(k) \end{bmatrix}$$

where $m_{pi}$ is the puddle mass at the port for cylinder i, $m_{fcyl\_i}$ is the fuel mass that goes into cylinder i, $a_j(i)=1$ when i=j, otherwise $a_j(i)=0$, Nr is the parameter that characters the velocity of liquid fuel leaving the puddle.

The equivalent fuel mass that goes through the exhaust port at a conjunction location (without air/fuel ratio sensor dynamic effects and mixing effects) is:

$$m_{fexh}(k) = \sum_{i=1}^{4} m_{fcyl\_i}(k)$$

If desired, sensor dynamics can also be included. For example, if using a UEGO sensor (assumed to be a first order system with a time constant of a) adds the following dynamics:

$$m_{fexh\_measured}(k+1) = m_{fexh\_measured}(k) + \alpha^{-1}(m_{fexh}(k) - m_{fexh\_measured}(k))$$

The above model can thus be used to determine the fueling dynamics for each intake port/cylinder system. Then, these dynamics can be used to calculate compensation to the injected fuel for each injection to provide a more accurate overall engine air-fuel ratio from cycle to cycle during transient conditions.

However, the model is first calibrated. In one example, fuel steps are applied, and the measured data used to calculate estimates of model parameters to be used in the compensation algorithm.

In another example, an optimization method to test individual cylinder transient fuel behavior and identify transient fuel model parameters and UEGO sensor/exhaust mixing time constant simultaneously is used. The method uses an impulse fuel input. The method can be used during the calibration phase or for adaptation during vehicle operation. This approach can provide improved results since it can better compensate for UEGO sensor dynamics (which can complicate identification), and other parasitic dynamics including multi-cylinder exhaust mixing, temperature changes, EGR, etc. Further, since it is difficult to separate UEGO sensor dynamics (which can vary with speed and load) from the transient fuel parameters, an impulse input can provide more accurate results.

In the case of the impulse input, at different engine operating conditions determined by engine speed, engine load (airflow) and engine coolant temperature, a fuel change (fuel impulse) is introduce for a single engine event to a particular engine cylinder while maintaining a constant airflow. As a simplification, the model can only track fuel mass left over in intake port after Intake Valve Closing (IVC), whether it is in vapor or liquid conditions. It is not required that liquid fuel puddle mass and fuel vapor be tracked separately, but they can be if desired.

Next, nominal transient fuel parameters $\chi, N_r = \tau$, and the UEGO sensor time constant $\alpha$ are simultaneously identified with a least squares identification procedure based on the following model:

$$m_p(k+4) = m_p(k) + \chi(i(k))m_f(k) - \frac{m_p(k)}{N_r(i(k))}$$

$$m_{fcyl}(k) = (1 - \chi(i(k)))m_f(k) + \frac{m_p(k)}{N_r(i(k))}$$

$$m_{fexh\_measured}(k+1) =$$

$$m_{fexh\_measured}(k) + \alpha^{-1}(m_{fcyl}(k - \Delta D_t) - m_{fexh\_measured}(k))$$

where:
k is the engine event number, i(k) is the cylinder number (1, 2, 3 or 4, for a four cylinder example) into which the fuel is scheduled during the event k (the actual fuel charge may for example be injected into the port during the event k+2 and can be inducted into the cylinder during the event k+4)

$m_f(k)$ is the injected fuel mass $m_p(k)$ is the mass of fuel and vapor left over in the port at intake valve closure (IVC)

$m_{fcyl}(k)$ is the mass of fuel and vapor inducted into the cylinder at IVC $m_{fexh\_measured}(k)$ is the derived from UEGO sensor measurement mass of fuel $\Delta D_t$ is the delay (engine cycle delay plus transport delay)

The criterion for a good match is that the simulated model accuracy has to agree with the measured data. Note, the same identification procedure on-line (on-board of the vehicle in the customer usage phase) can be applied to fine-tune the transient fuel parameters in closed to steady-state operating conditions. Note that fuel impulse applied in close to steady-state conditions creates less of a disturbance to the customer than a fuel step.

With the identified parameters, the following algorithm is applied to determine the injected fueling mass for each engine event:

$$m_f(k) = \frac{1}{1 - \chi(i(k))} \left\{ \frac{m_{air}(k)}{(A/F)_{des}} - \frac{m_p(k)}{N_r(i(k))} \right\},$$

where $(A/F)_{des}$ is the desired A/F and $m_{air}(k)$ is the air amount on the event k. Since the compensation and model are on an individual cylinder basis, different parameters can be identified for each cylinder. In other words, different operation between cylinders can lead to different parameters. Further, whether a cylinder is active or inactive can also determine the parameters applied for that cylinder, and other cylinders.

Figure 3A:
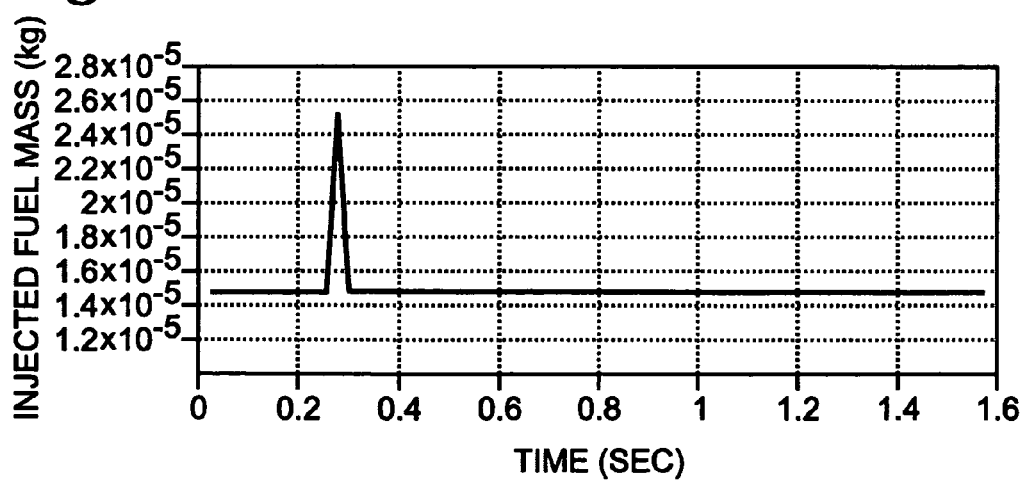
FIGS. 3A–3D show experimental data for identifying dynamic fueling parameters and validation of predicated air/fuel behavior based on identified parameters.
Figure 3B:
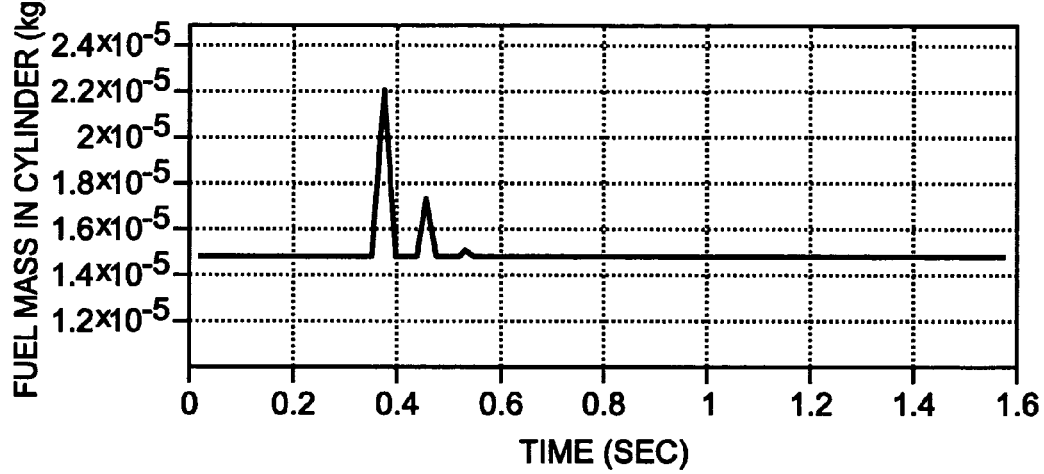
Figure 3C:
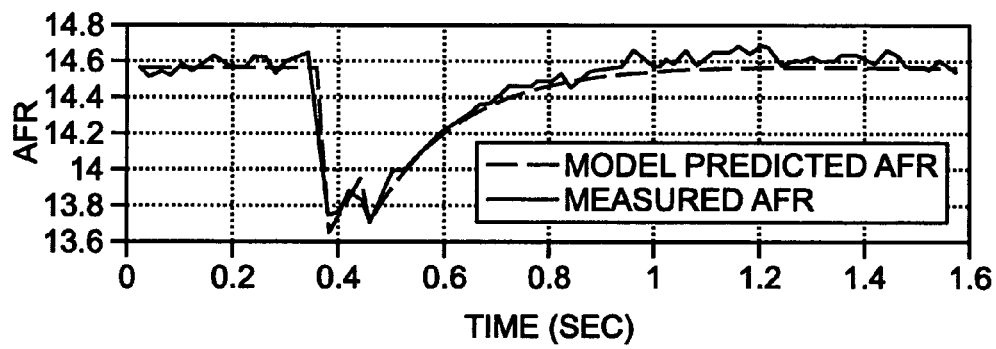
Figure 3D:
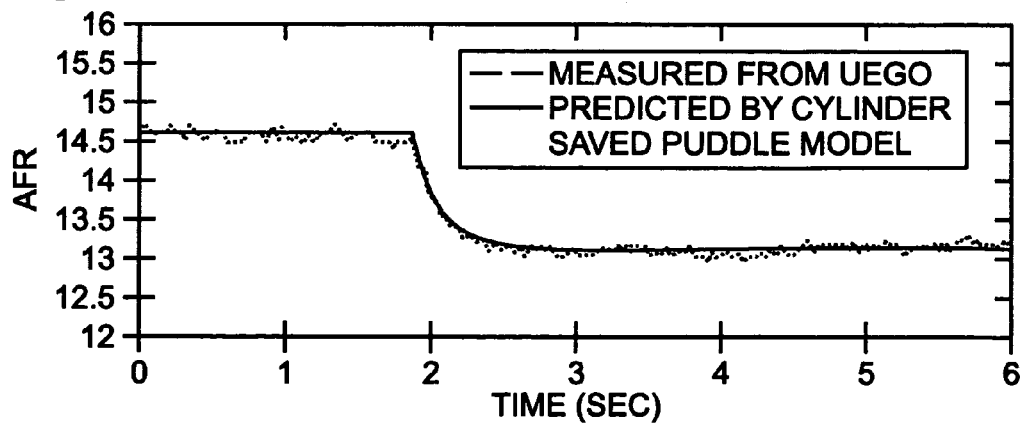

Example experimental validation data is shown in FIGS. 3A–D. Specifically, FIG. 3A shows the injected fuel mass (impulse fuel input) to the cylinder used in exciting the system for system identification. FIG. 3B shows calculated cylinder mass in the cylinder based on the impulse input. FIGS. 3C and 3D show a comparison between Air/Fuel response from identified model and test data (3C shows a response to a fuel impulse and 3D shows a response to fuel step increase). The close agreement in FIGS. 3C and 3D between the estimated and measured air to fuel ratio validates the approach. The following parameter values were identified for this data 1500 rpm:

$\hat{\chi}0.293, \hat{\tau}0.0912(N_r \approx 1.14 \text{ cycle}), \hat{\alpha} \approx 0.149.$ Note that in the case of an electric valve actuated engine (e.g., electrically actuated intake valves, or both intake and exhaust valves), the above approach is especially useful due to the need to identify the individual cylinder transient fuel behavior to enable operation in various engine modes and to provide the individual cylinder compensation. In other words, electrically actuated valves provide several additional challenges for transient fuel compensation.

Figure 4:
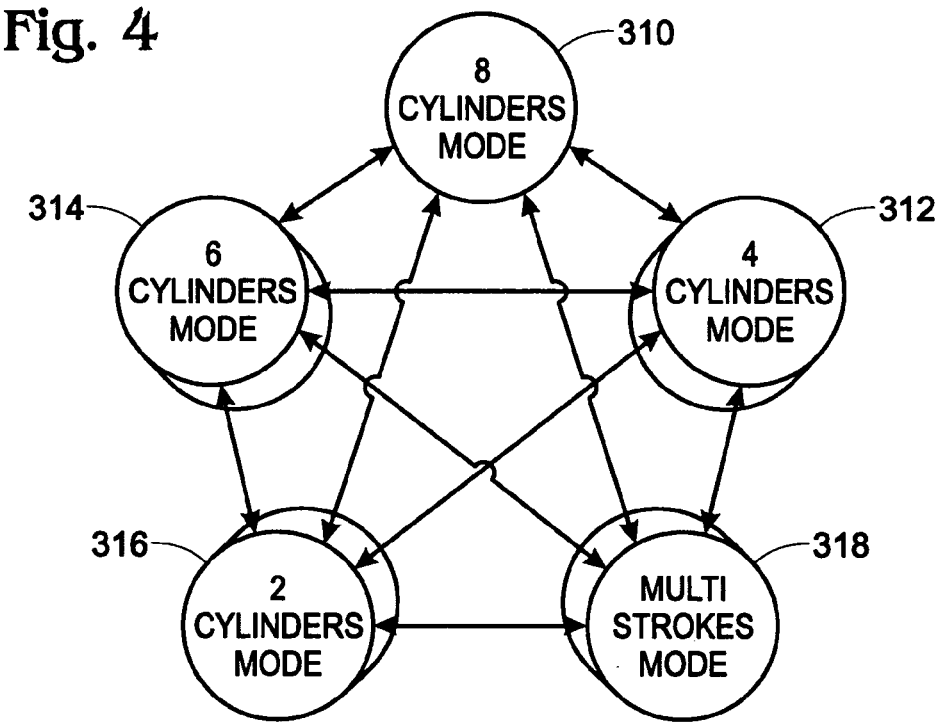
FIGS. 4–6 show block diagrams of modes and routines carried out by the controller.

For example, in the case of a v-8 electric valve actuation system, various engine operating modes can be encountered, as shown in FIG. 4. The Figure shows 5 example modes, including: 8 cylinder mode (all cylinders operating) at 310; 4 cylinder mode (and 4 cylinders with at least one deactivated intake valve) at 312; 6 cylinder mode (and 2 cylinders with at least one deactivated intake valve) at 314; 2 cylinder mode (and 6 cylinders with at least one deactivated intake valve) at 316; and multi stroke modes (where the cylinders operate at other than 4-stroke combustion, such as, for example, 6-stroke where 2 strokes are performed with an evacuated cylinder) at 318. Alternatively, 12 stroke operation could be used. As indicated in FIG. 4, the engine has numerous transitions between these operating modes, each of which requires accurate wall wetting dynamic fuel compensation to account for the fueling dynamics associated with these transitions. As such, the above described approach is especially advantageous in such a situation.

Note that when the engine operates with variable stroke combustion cycles, the transient fuel compensation can be adjusted as discussed below to account for this variation. As such, different transient fueling dynamics that can occur depending on the number of strokes in the combustion cycle can be accounted for. As such, increased air-fuel ratio control both during, and when transition in and out of, multi-stroke operation is achieved.

As will be appreciated by one of ordinary skill in the art, the specific routines described below in the flowcharts and block diagrams may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 5:
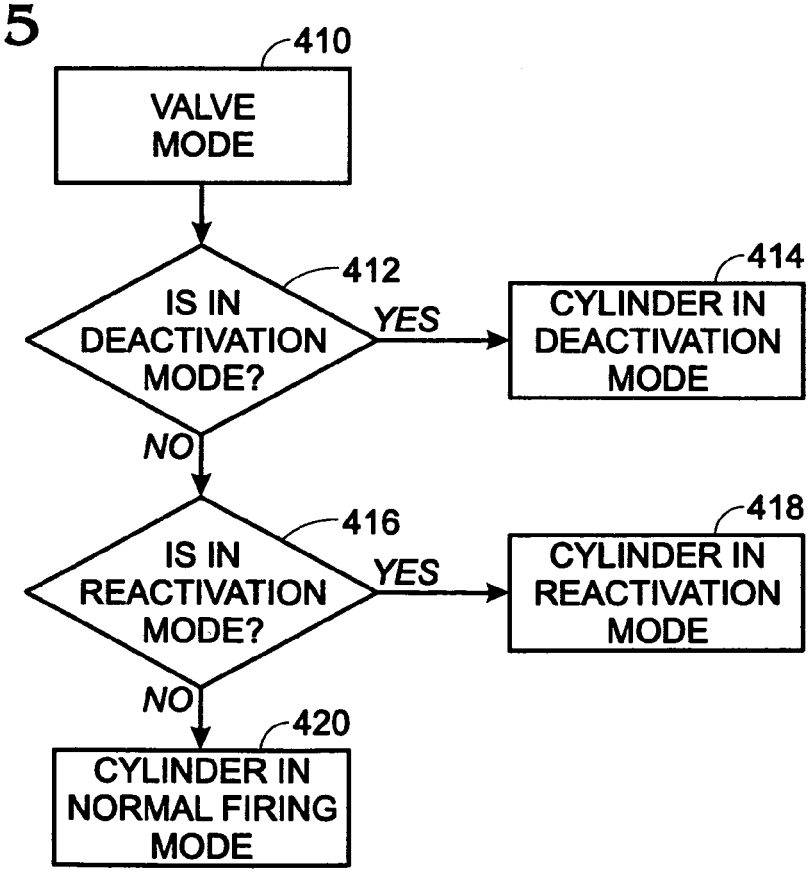
Figure 6:
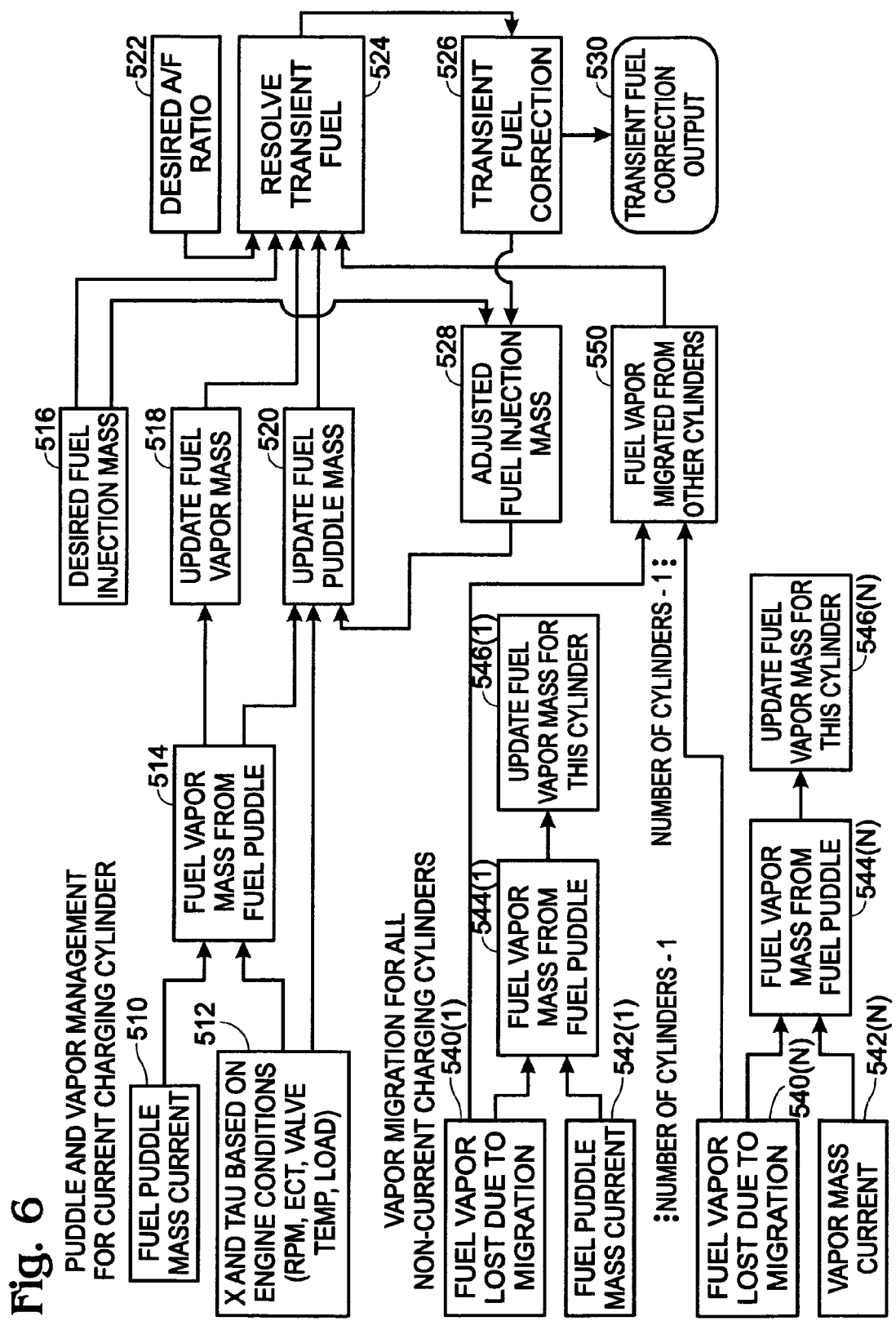

Referring now to FIGS. 5 and 6, a routine and control block diagram are described for controlling fuel injection in an electric valve actuated engine.

Specifically, in FIG. 5, a routine is described for identifying the cylinder mode. First, in step 410, the routine reads the valve mode for each cylinder of the engine. Then, in step 412, the routine determines whether the engine is in a deactivation mode, where at least one cylinder valve is deactivated. If so, the routine indicates deactivation mode in step 414. Otherwise, the routine determines whether the engine is in a reactivation mode in step 416. If so, the routine indicates reactivation mode in step 418. Otherwise, the routine indicates normal firing in step 420.

Referring now to FIG. 6, a block diagram of a routine is shown for using the cylinder modes and dynamic fuelling model for an electric valve actuated engine. The block diagram has a first input set (blocks 510–514) for the puddle and vapor generation management for the current charging cylinder. A second input set (blocks 540(1)–546(1), 540(2)–546(2) (not shown), . . . 540(N)–546(N)) for vapor migration for the non-currently charging cylinders. Then, these inputs are processed in various ways, as discussed in more detail below at blocks 518, 520, 528 and 550 and used along with the desired fuel injection amount (block 516) and the desired air-fuel ratio (block 522) to complete the transient fuel model at block 524.

Finally, a correction is obtained in block 526 and output at block 530 to be used in calculating the fuel injection amount to be delivered to each cylinder. This transient fueling compensation value can be combined with feedback corrections from the exhaust gas oxygen sensors to allow the combustion air-fuel ratio to approach a desired air-fuel ratio. The feedback can be of a proportional and integral type, or another appropriate form. Further, additional feedforward compensation, such as to compensate for airflow dynamics, can also be used.

The following steps illustrate this operation in detail with the corresponding equation used. These equations correspond to those described above, but modified to take into account deactivated cylinders and vapor generation and migrations.

First, for the cylinder at the current event that is in an active, firing, mode, the fuel puddle mass at current event k, at the cylinder port i, can be calculated as:

$$m_p(k, i) = m_p(k - 1, i) + m_{fi}(k, i)\chi(i) - \frac{m_p(k - 1, i)}{N_\tau(i)}$$

Then, the fuel mass coming into the cylinder i can be calculated as:

$$m_{fc}(k,i) = m_{fi}(k,i)(1-\chi(i)) + m_{fvc}(k,i)$$

The fuel vapor charged into the cylinder i can be calculated as:

$$m_{fvc}(k,i) = f(m_{airchg}(k,i), V_{runner\_max}, T_{airchg}(k,i), P_{airchg}(k,i), m_{fv}(k,i))$$

An example of this general function can be as follows. In particular, air charge mass $m_a$ and air charge mass volume $V_a$ can be related by $$V_a = \frac{m_a RT}{P_m}.$$

Assuming the vapor density is the maximum at the ports and zero at the end of the runner, the vapor charged into cylinder can be found as:

$$m_{vc} = 0.5\left(\frac{4m_v}{V_{max}} - \frac{2m_v}{V_{max}^2}V_a\right)V_a$$

where $V_{max}$ is the maximum runner volume.

Fuel vapor generation at the current event of cylinder i can be calculated as:

$$m_{fv}(k, i) = m_{fv}(k - 1, i) + \frac{m_p(k - 1, i)}{N_\tau(i)} + \sum_{\substack{j=1 \\ j \neq i}}^{n} m_{fv\_migrated}(k, j)$$

And finally, fuel vapor generation at the non-current event of cylinder j (j≠i), can be calculated as:

$$m_{fv}(k,j) = m_{fv}(k-1,j) - m_{fv\_migrated}(k,j)$$

$$m_{fv\_migrated}(k,j) = f(m_{fv}(k,j), m_{airchg}(k,i), V_{runner}(j), P_{man}, T_{man})$$

where:
- $m_{fi}$ is the injected fuel mass
- $m_{fc}$ is the cylinder fuel mass
- $m_{fvc}$ is the cylinder fuel vapor mass
- $m_{fv}$ is the fuel vapor mass generated from a puddle
- $m_{fv\_migrated}$ is the fuel vapor mass that migrates from a deactivated cylinder to other cylinders
- $m_{airchg}$ is the cylinder air mass
- $V_{runner\_max}$ is maximum volume of the runner in the intake manifold
- $T_{airchg}$ is the temperature of the air charge entering the cylinder in the intake manifold
- $P_{airchg}$ is the intake manifold pressure Note that evaporated fuel can be determined based on a time since deactivating a cylinder, when cylinder deactivation is utilized.

Second, when the cylinder at current event is in deactivation mode, the following calculations are performed. Specifically, fuel vapor generation at the current event of cylinder i can be calculated as:

$$m_{fv}(k, i) = m_{fv}(k - 1, i) + \frac{m_p(k - 1, i)}{N_\tau(i)}$$

Alternatively, a time based format can be used since vapor migration may be more easily identified in time parameters as:

$$m_{fv}(k, i) = m_{fv}(k-1, i) + \frac{m_p(k-1, i)}{\tau(i)} \Delta t$$

where $\Delta t=120/(N*N_{cyl})$, $N_{cyl}$ is the number of cylinders and N is engine speed in RPM. Again note that evaporated fuel can be determined based on a time since deactivating a cylinder, in one example.

When a cylinder at current event is in re-activation mode, it is similar to normal firing mode except that $\chi$-$\tau$ or $\chi$-$N_\tau$ in discrete form have a correction due to valve temperature change because the deactivation of this cylinder while in normal firing mode there is no such correction.

Thus, in this example, fuel vapor charged into the cylinder is calculated as a function of air charge mass, runner volume, engine speed, manifold pressure and temperature, and the amount of fuel vapor in the port plus the fuel vapor migrated from other cylinders. Further, the fuel puddle mass at the port is calculated as a function of air charge mass, engine speed, engine temperature, valve timings, valve mode, manifold pressure and temperature. Finally, the firing cylinder status is also identified by either reactivated cylinder or normal firing cylinder, which indicates it has been in continuous firing status for a certain number of cycles.

In this way, it is possible to accurately determine the transient fuel dynamics of the cylinder based on whether the cylinder is active. Further adjustments to the parameters can be included to account for effect of variations in valve lift, valve timing, intake valve lift, exhaust valve timing, and combinations and sub-combinations thereof. For example, in the case where electrically actuated intake valves, and variable cam timing exhaust valves are used, it is possible to provide accurate transient fuel compensation to accurately maintain a desired air-fuel ratio, even if cylinder deactivation is not used.

Figure 7A:
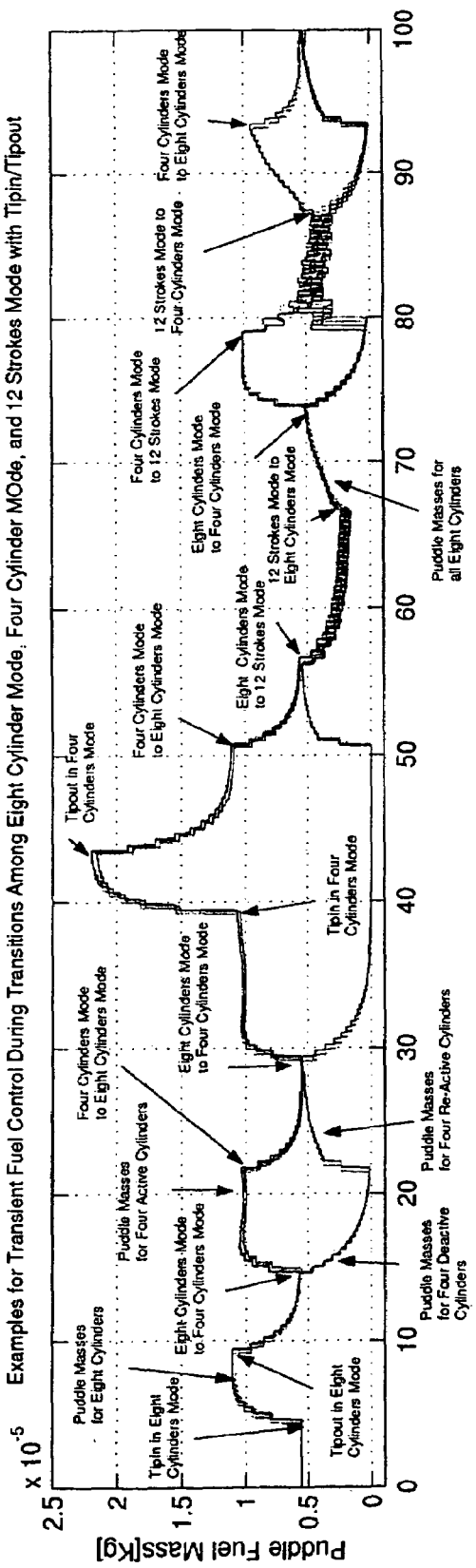
FIGS. 7A–7C show additional graphs illustrating operation of the routines.
Figure 7B:
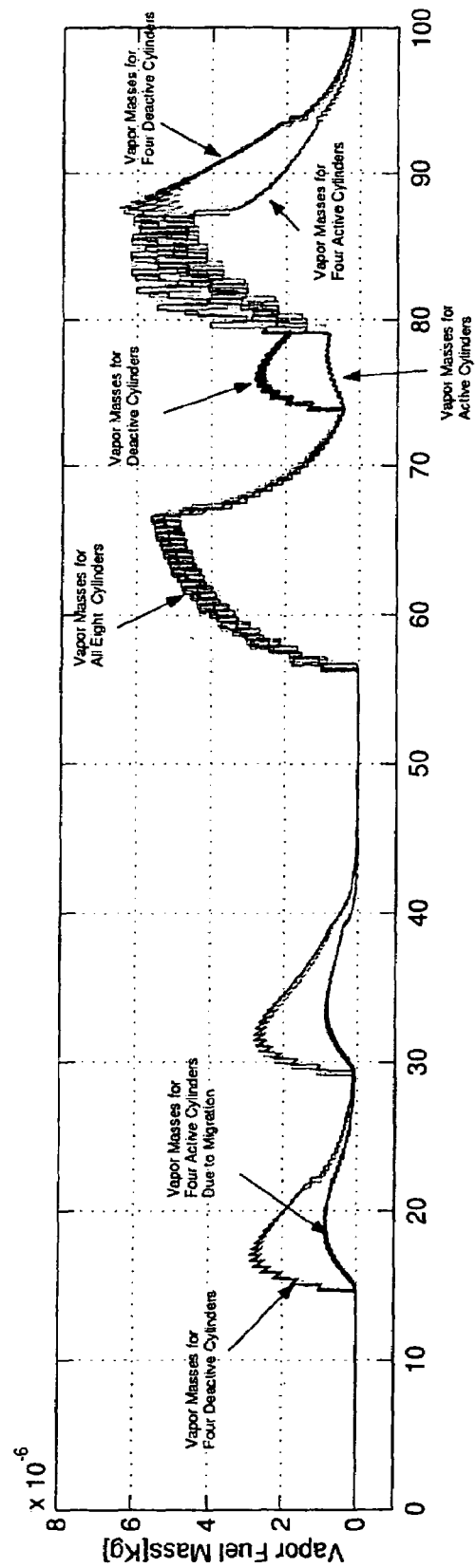
Figure 7C:
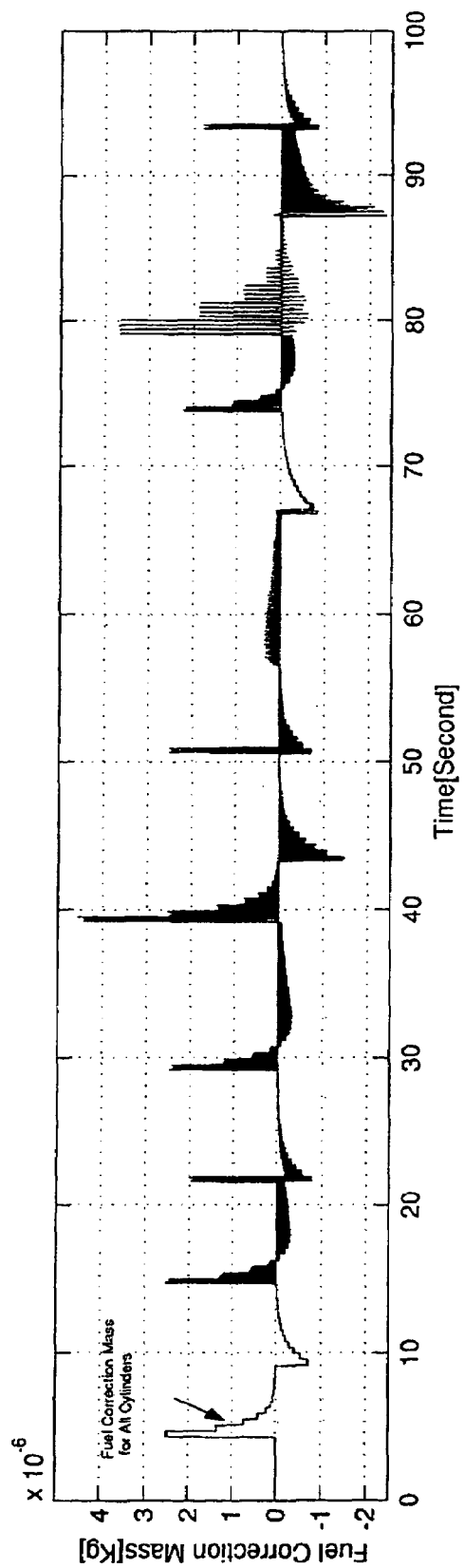

Simulation results are shown for an example 8 cylinder engine as shown in FIGS. 7A–C. FIGS. 7A–C show the puddle mass and vapor mass calculated for each cylinder during various transient engine conditions and during various mode transitions of the engine. Specifically, the results are shown first during 8 cylinder mode with tip-in and tip-out changes requested by the driver (where air charge is increased/decreased by changing, for example, intake valve lift and/or timing). Then, a transition from 8 cylinder mode to a variable displacement mode (VDE) mode, such as 4 cylinder mode, and then back to 8 cylinder mode. Next, mode transitions are combined with tip-in and tip-out operations. Next, the engine is transitions between 8 cylinder mode and a multi-stroke mode (12-stroke operation in this example), and back again. Finally, the engine is transitioned between 8 cylinder mode, variable displacement mode, and multi-stroke mode, and back again.

The Figures illustrate the transient operation that is identified using the approach described herein, and the corresponding compensation amount calculated (TFC Mass).

Figure 8A:
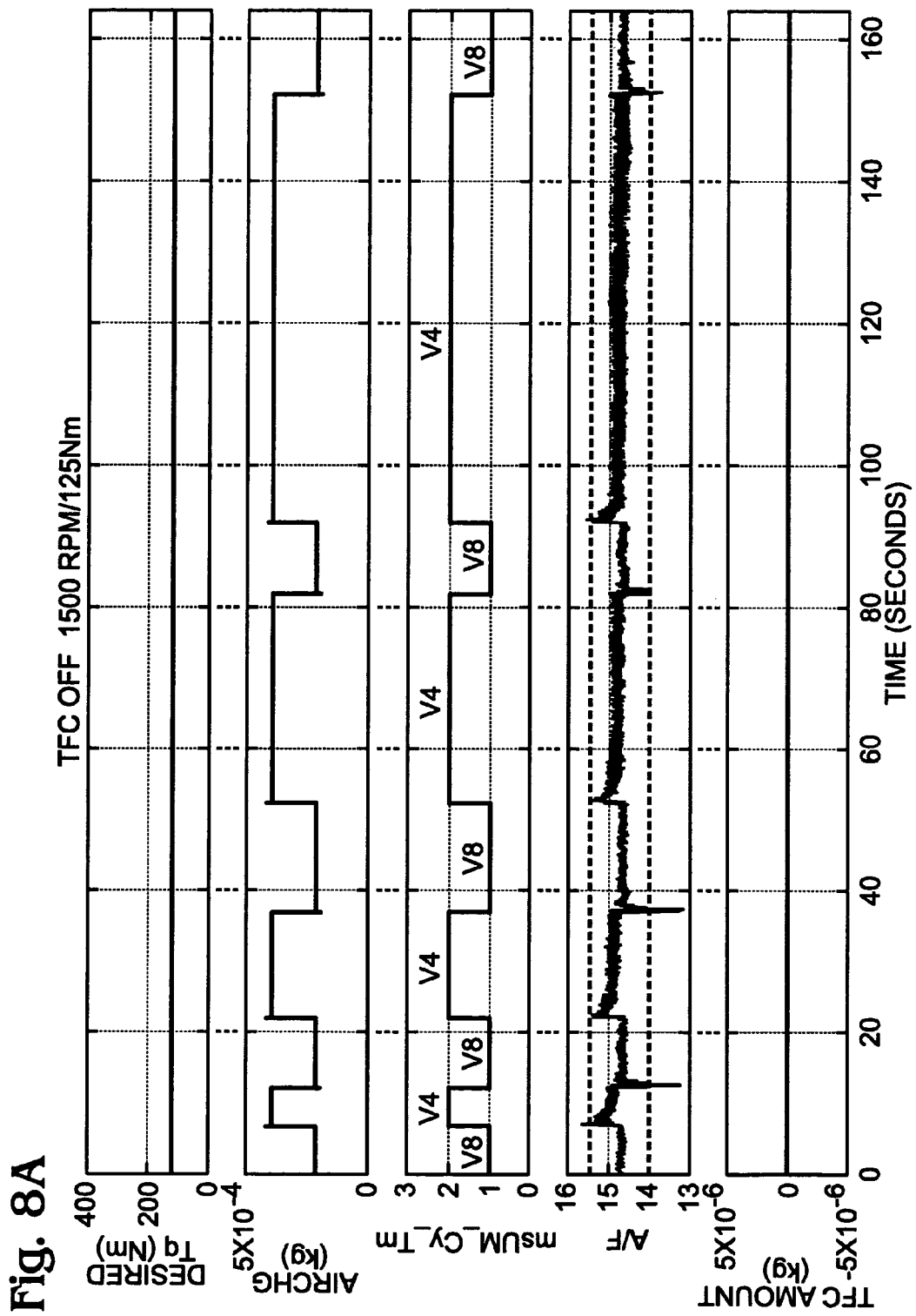
FIGS. 8A–8B show additional experimental results for a variable displacement engine case.
Figure 8B:
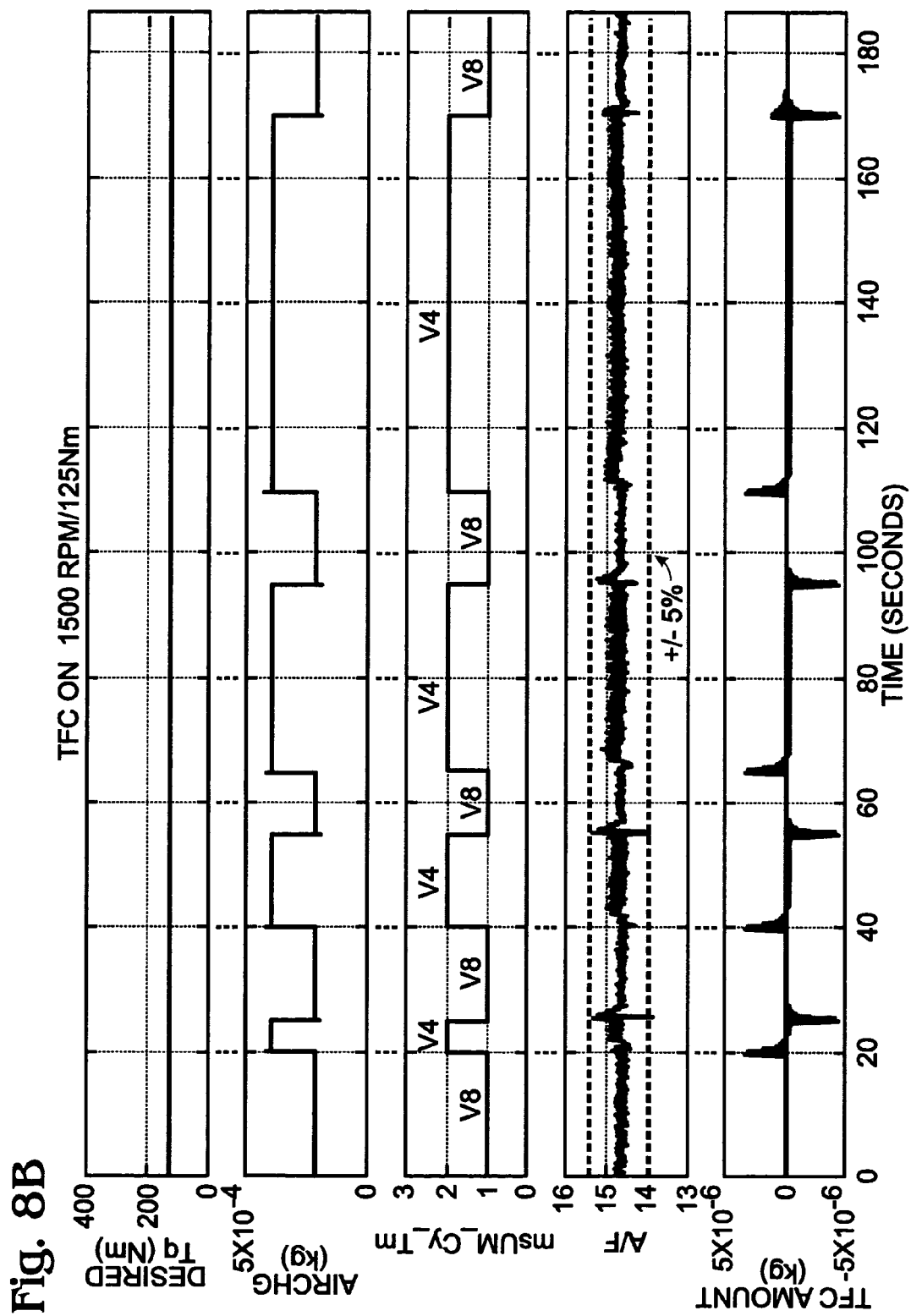

Referring now to FIGS. 8A and 8B, additional simulation data is shown. Specifically, transient fuel compensation as described above is turned off in FIG. 8A, and enabled in FIG. 8B. The Figures show engine mode transitions between four and eight cylinder operation, and the corresponding air-fuel ratio, along with other parameters. Improved air-fuel ratio control can easily be seen in the results of FIG. 8B compared with that of FIG. 8A.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. For example, various types of engines, such as 4-cylinder, 6 cylinder, inline, and v-type engines can be used.

The following claims particularly point out certain combinations and subcombinations. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling an engine having a plurality of cylinders, wherein at least one cylinder is capable of being mechanically deactivated, the method comprising:
    adjusting fuel injection amounts injected into active cylinders of the engine based on whether said at least one cylinder is mechanically deactivated;
    wherein said adjusting is at least based on a migration of fuel between said at least one mechanically deactivated cylinder and an active cylinder of the engine.

2. The method of claim 1 wherein said mechanical deactivation of the cylinder is performed by deactivating an electrically actuated intake valve.

3. The method of claim 1 wherein said adjusting of fuel injection amounts injected into active cylinders is performed during deactivation of said one mechanically deactivated cylinder.

4. An article of manufacture comprising:
    a sensor for measuring an exhaust gas oxygen amount; and
    a computer storage medium having a computer program encoded therein for controlling fuel injection in an internal combustion engine having fuel injectors coupled in intake ports thereof, said computer storage medium comprising:
        code for operating the engine in at least two modes including an active mode where the intake valves are operating and injected fuel and air are combusted in a cylinder of the engine, and a deactivated mode where valves of the cylinder are deactivated;
        code for adjusting a fuel injection amount to the cylinder based on said sensor and a dynamic fueling compensation value determined based on the cylinder mode; and
        code for operating the engine in a third mode where the cylinder operates in a greater than four stroke cycle.

5. The article of claim 4 wherein said code for adjusting fuel injection calculated said dynamic fueling compensation on an individual cylinder basis.

6. The article of claim 4 wherein said code for adjusting said fuel injection amount further adjusts said fuel injection amount based on transitions between said first and second mode.

7. The article of claim 4 wherein the engine deactivated valves in the cylinder via an electrically actuated intake valve.

* * * * *